Jan. 28, 1964

F. H. BIHLER 3,119,400

CONTROL FOR AUTOMATIC PIPE LINE CLEANSING SYSTEM

Filed Feb. 29, 1960

INVENTOR.
FREDERICK H. BIHLER
BY
BLAIR, SPENCER & BUCKLES
ATTORNEYS.

Jan. 28, 1964 F. H. BIHLER 3,119,400
CONTROL FOR AUTOMATIC PIPE LINE CLEANSING SYSTEM
Filed Feb. 29, 1960 2 Sheets-Sheet 2

INVENTOR.
FREDERICK H. BIHLER
BY
BLAIR, SPENCER & BUCKLES
ATTORNEYS.

United States Patent Office 3,119,400
Patented Jan. 28, 1964

3,119,400
CONTROL FOR AUTOMATIC PIPE LINE
CLEANSING SYSTEM
Frederick H. Bihler, Stamford, Conn., assignor to The De Laval Separator Company, Poughkeepsie, N.Y., a corporation of New Jersey
Filed Feb. 29, 1960, Ser. No. 11,779
24 Claims. (Cl. 134—57)

This invention relates to controls for fluid flow in pipe line systems such as vacuum milking installations, and more particularly to an improved automatic control system for cleaning the milk pipe line of such installations.

Vacuum milking installations as commonly constructed comprise a milk pipe line having a plurality of stall cocks to each of which the milk hose from a milking apparatus or unit may be connected. The milking units draw milk from the respective cows and deliver the milk through the corresponding milk hoses and stall cocks to the common milk pipe line, which is connected to a vacuum pump for drawing the milk along the pipe line toward a collecting vessel, such as a milk tank. In some cases, the collecting vessel itself is maintained under vacuum to draw the milk directly from the pipe line into the vessel; and in other cases the milk pipe line leads to a so-called "releaser" connected to the vacuum pump and from which the milk is withdrawn, as to a milk pump for delivering the milk to a storage tank or other collecting vessel.

For sanitary reasons, it is necessary that milking installations of this type be thoroughly cleaned from time to time. The portions of the milk pipe line which contact the milk should be thoroughly washed with a suitable solution and rinsed after each milking operation. It is, of course, difficult and time-consuming to disassemble the milk pipe line to effect the necessary cleaning and then reassemble the parts for the next milking operation. Accordingly, such milking installations have been provided with so-called "in-place" cleaning systems by which the milk pipe line can be cleaned without disassembling it.

In order to save labor in the use of such "in-place" cleaning systems, attempts have been made to provide a completely automatic cleaning system which, when started, circulates the necessary washing and rinsing liquids through the milk pipe line in the proper sequence and for the required time intervals without supervision by an operator. However, these automatic "in-place" cleaning systems, so far as I am aware, leave much to be desired, not only in their reliability for consistent day-to-day operation, but also in the thoroughness with which they effect all of the desired operations to prepare the installation for the next milking. For example, in certain automatic systems of this type, a timer is provided for controlling all of the major operations, including the operations incident to rinsing the system, then washing the system with a detergent solution, and then re-rinsing the system including the milk pipe line. Consequently, should there be a failure in any of these operations controlled by the timer, such as failure of the usual reservoir to be sufficiently filled from the water line to provide the necessary quantity of cleaning liquid for circulation through the milk pipe line, the cleaning operation will be impaired. Also, damage to the system and inconvenience in general may result from failure of one of the operations under control of the timer, as through delivery of an excess quantity of liquid to the reservoir during the time interval allotted by the timer.

Accordingly it is a principal object of this invention to provide a control system for automatically controlling "in-place" washing systems for vacuum milking installations;

Another object of this invention is to provide a control system of the above described character which results in effective and thorough cleaning of the milk pipe line and associated milk vessels;

A further object of this invention is to provide a control system of the above described character which results in predetermined and assured amounts of wash and rinse water passing through the milk pipe line and associated vessels:

A still further object of this invention is to provide a control system of the above described character which causes air to be drawn through the milk pipe lines and associated vessels after washing and rinsing, to remove water from the milking system;

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

The system of the present invention comprises tank means forming a chamber or reservoir for a liquid to be circulated through the milk pipe line, a supply line for delivering liquid to the tank chamber, a liquid supply valve in this supply line, and conduit means leading from the lower portion of the tank chamber to one end portion of the milk pipe line. A circulating pump has its inlet connected to the other end portion of the milk pipe line and is adapted to be fed with liquid sucked from the tank through the conduit means and the milk pipe line. A baffle-like valve is provided for directing return water in the system and is hereinafter referred to as a diversion valve. The diversion valve is connected to the pump outlet and is normally in a first position to direct liquid from the pump to a waste drain, or in a second position to direct liquid from the pump back to the reservoir. The system also comprises means for opening the supply valve to accumulate liquid in the tank chamber, a device responsive to a high liquid level in the chamber, means operable by this responsive device for closing the supply valve, means also operable by the responsive device for operating the pump with the diversion valve in its re-circulating position and re-cycling liquid from the chamber through the conduit means and milk pipe line. In addition, the system includes a first timer, means operable by the high level responsive device for starting the first timer, means operable by the first timer to shift the diversion valve to its drain position and lower the liquid level in the tank chamber, whereby continued operation of the pump draws air through the conduit means and pipe line for drying them, a second timer, means responsive to lowering of the liquid level in the tank chamber to a low level for starting the second timer, and means operable by the second timer for stopping the pump.

The new system as described above is well suited for washing the milk pipe line with an aqueous detergent solution as the circulating liquid, it being apparent that the filling of the reservoir or tank chamber with such solution is not under control of a timer but is controlled by the high level responsive device, the first timer coming into operation when the necessary quantity of solution has accumulated in the chamber and insuring that this quantity is re-cycled through the pipe line for the necessary period of time to effect thorough washing. Also, when the first timer causes shifting of the diversion valve and lowering of the liquid level in the tank chamber, the second timer does not come into operation until the liquid has dropped to a predetermined low level, at which time air is drawn through the conduit means and milk pipe line for a drying period determined by the second timer.

In the preferred form of the new system as described above, the operating means for the circulating pump includes a receiver located in the milk pipe line intermediate its end portion, a vacuum pump connected to the receiver, means operable by the device responsive to the high liquid level in the tank chamber for starting the vacuum pump and thereby drawing liquid into the receiver from the tank chamber, means responsive to a high liquid level in the receiver for starting the circulating pump and thereby reducing the liquid level of the receiver, means responsive to lowering of the liquid level in the receiver to a low level for stopping the circulating pump to increase the liquid level in the receiver, whereby the circulating pump is operated intermittently, and means responsive to lowering of the liquid level in the tank chamber to a predetermined low level for operating the circulating pump continuously under control of the second timer. Also, means operable by the second timer are provided for stopping the vacuum pump so that both pumps are stopped after the drying period.

The system in its preferred form is arranged to carry out a rinsing operation both before and after the wash-in operation. Each rinsing operation is similar to the washing and drying operation except that the initial valve operation admits only rinsing water (instead of detergent solution) into the reservoir, the first timer does not come into operation, and the diversion valve is normally in its first position to divert water from the circulating pump to waste, whereby the timing of the rinse is determined by the time it takes for this pump to lower the water level in the tank chamber to the point where the low-level responsive means for this chamber starts the second timer which controls the drying operation. The rinse-dry, wash-dry and re-rinse-dry operations are effected automatically in the proper sequence once the system has been started in operation, and upon completion of the final re-rinse-dry operation the system is automatically shut down.

For a fuller understanding of the nature and objects of the invention, reference should be had to the following detailed description taken in connection with the accompanying drawings, in which:

FIG. 3 is a schematic view of part of the system illustrated in FIG. 1, showing a modification of the circulating pump.

Figure 1:
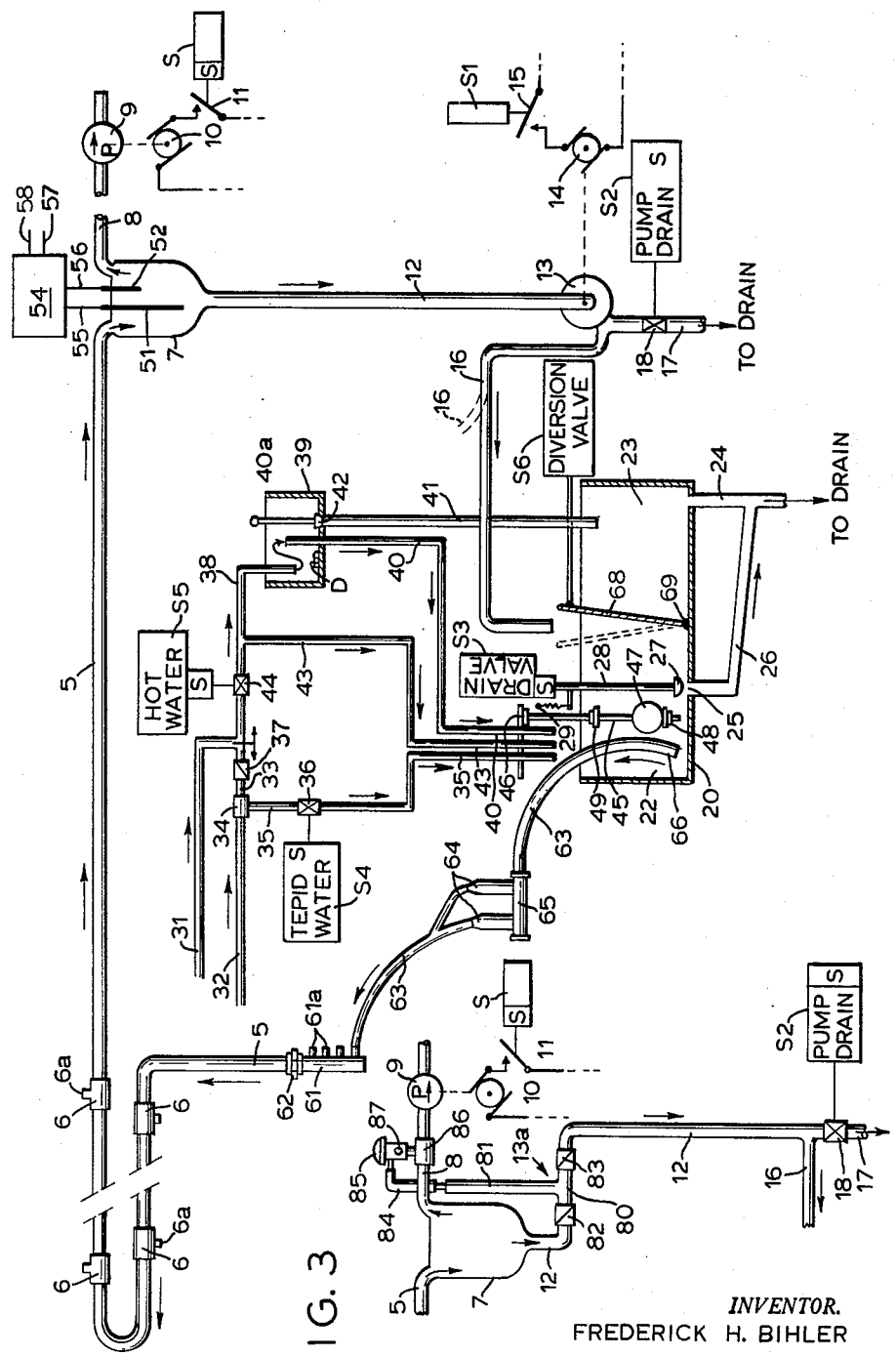
FIG. 1 is a schematic view of the preferred form of the new cleaning system.

Referring to FIG. 1, the system there shown comprises a milk pipe line 5 provided with the usual stall cocks 6 having nipples 6a to which the milk hoses from individual milking units (not shown) may be connected for the milking operation, as will be readily understood by those skilled in the art. The stall cocks 6 are of the well-known type having a valve (not shown) which is closed manually or automatically when the milk hoses are disconnected from the nipples 6a after completion of the milking operation, so that air can not enter the milk pipe line through the stall cocks. Since stall cocks of this type as well as the milking units are items well-known in the art, and their details are not pertinent to the present invention, it is unnecessary to describe them with further particularity.

The milk pipe line 5 leads from the stall cocks 6 to the upper portion of a receiver 7 in the form of a transparent jar. A pipe 8 extends from the upper portion of receiver 7 to a vacuum pump 9 driven by an electric motor 10, the energizing and de-energizing of which is effected by a switch 11 operated by solenoid S. A pipe 12, forming in effect an extension of the milk pipe line 5, extends from the bottom of receiver 7 to the inlet of a circulating pump 13, which may be of the centrifugal type.

The pump 13 is driven by an electric motor 14, the energizing and de-energizing of which is effected by a switch 15 under control of a solenoid S1. The outlet of circulating pump 13 is connected to a conduit 16 which, in the milking operation, leads to a milk collecting point such as a storage tank, can, etc. (not shown), as indicated in dotted lines and as is well-known in the art. A drain pipe 17 leads from the bottom of the circulating pump 13 and has a drain valve 18 operable by a solenoid S2.

It will be understood that in the milking operation the vacuum pump 9 draws milk into the receiver 7 from the stall cocks 6 via the milk pipe line 5, and the circulating pump 13 draws milk from the bottom of receiver 7 and pumps it under pressure through conduit 16 to the storage tank or other collecting vessel. Thus, the pumps 9 and 13 are operated by energizing of their respective solenoids S and S1.

The pipe line cleaning system comprises a tank 20 having a diversion valve 68 pivoted at 69 which divides the tank into a storage chamber or liquid reservoir 22 and a waste receptacle 23, the latter opening at the bottom into drain pipe 24. The storage chamber 22 has a bottom outlet 25 leading to the drain pipe 24 by way of a pipe 26. The drain outlet 25 is adapted to be closed by a drain valve 27 connected by a vertical rod 28 to a solenoid S3. The drain valve 27 is normally held open by a spring 29 and is closed by energizing of the solenoid S3.

The storage tank 22 is applied with water from a hot water line 31 and a cold water line 32. The hot water line 31 has a branch 33 terminating in a mixing T 34 to which the cold water line 32 leads. A pipe 35 extends from the thermostatic mixing valve 34 to a point directly above the bottom of storage chamber 22. A valve 36 in the pipe 35 is operatively connected to a solenoid S4, and a check-valve 37 may be provided in the branch 33 if needed to prevent cold water entering the hot water line. When valve 36 is opened by energizing of solenoid S4, both hot water from line 31 and cold water from line 32 will flow through pipe 35 into the storage chamber 22, thereby filling the latter with tepid water for rinsing.

A second branch 38 of the hot water line 31 leads to a detergent container 39. A pipe 40 extending through the bottom of this container leads to a point directly above the bottom of the storage tank 22, the upper end of the pipe 40 being located within container 39 and well above the bottom thereof. Another pipe 43 leads directly from the branch line 38 down to a point directly above the bottom of storage chamber 22, and a valve 44 is located in branch line 38 to control flow of hot water to pipe 43 and container 39. The valve 44 is operatively connected to a solenoid S5.

Normally, the container 39 contains a supply of detergent D. Consequently, when the valve 44 is opened by energizing of its solenoid S5, hot water is supplied directly to storage chamber 22 through pipe 43 and indirectly to this chamber through container 39 and pipe 40, as a detergent solution. The hot water entering container 39 forms a solution with the detergent D, this solution rising to the level of the upper end 40a of pipe 40 and over-flowing this end into the pipe and down to the storage chamber 22.

A drain pipe 41 leads from the bottom of container 39 to the drain receptacle 23, the upper end of this pipe being normally closed by a manually operated drain valve 42. After each complete cleaning operation of the system, the drain valve 42 is raised to drain the remaining detergent solution from container 39 and is then re-closed. A fresh supply of detergent D is introduced into the chamber 39 in preparation for the next cycle of the cleaning system to follow the next milking operation.

Associated with the chamber or reservoir 22 is a level responsive means comprising a vertical rod 45 mounted in suitable bearings (not shown) for up-and-down movement and adapted to remain in a certain position until it is moved up or down to another position. At its upper end, the rod 45 is connected to a switch arm 46 coacting with upper and lower contacts U and L, respectively. The rod 45 extends loosely through a hollow float 47 located in the tank chamber 22 and confined between lower and upper stops 48 and 49, respectively, on the rod 45.

When chamber 42 is substantially empty, the float 47 rests on the lower stop 48 and holds switch arm 46 against its lower contact L; but as liquid fills this chamber due to energizing of the valve solenoid S4 or S5, float 47 rises along rod 45 and finally engages upper stop 49 and lifts it to move rod 45 to its upper position, thereby moving switch arm 46 from lower contact L to upper contact U. This de-energizes the valve solenoid S4 or S5 so as to shut off the liquid flow to chamber 22, as will be described presently. Thereafter, rod 45 and switch arm 46 remain in their upper positions even with a considerable lowering of the liquid level in chamber 22, because it is not until this level drops to a low point that float 47 engages the lower stop 48 and returns rod 45 to its lower position, thereby returning switch arm 46 from its upper contact U to its lower contact L. The stops 48—49 may be adjustable vertically on rod 45 so as to vary the high liquid level at which switch arm 46 is caused to engage upper contact U and the low liquid level at which the switch arm is returned to lower contact L. It is to be understood the switching mechanism associated with and operable by the float valve 48 is of the snap action type.

The receiver 7 is also provided with a level responsive switching means, which in this case comprises a pair of probes 51 and 52 extending into the receiver to different levels. A ground connection 53 is in contact with the milk within the receiver. A control circuit 54 is shown in block diagram form. It can be of any commercial type which senses liquid level by the use of probes and then operates a control mechanism over the pumping of said liquid. Leads 55 and 56 connect probes 51 and 52 respectively to the control circuit 54. Leads 57 and 58 provide power for circulating pump 13 through control circuit 54 as determined by the liquid level in receiver 7. Thus vacuum pump 9 operates to draw liquid from pipe line 5 into receiver 7 and circulating pump solenoid S1 is controlled by circuit 54 through lead 58 to maintain proper liquid level in the receiver, the latter pump will be operated intermittently to draw liquid from the receiver, it being understood that the circulating pump 13 can withdraw liquid from the receiver at a rate greater than the rate at which the vacuum pump 9 draws liquid into the receiver.

In preparing the system for cleaning, the end of the milk pipe line 5 remote from the discharge conduit 16 is connected through conduit means 63—66 to the lower portion of tank chamber 22. Such conduit means include the milk hoses and teat cups of the individual milking units previously connected to the stall cocks 6. That is, each milk hose 63 is disconnected from the corresponding nipple 6a used for milking and connected to a nipple 61a on a manifold 61 which is releasably coupled to this remote end of pipe line 5 by a coupling 62. The teat cups 64 from which the hose 63 leads (only two of the four teat cups are shown) are applied to tightly fitting nipples (not shown) on a manifold 65 from which the hose 66 leads to the bottom portion of chamber 22. The milk hoses and teat cups of the other milking units (not shown) are similarly connected to the manifolds 61 and 65 respectively. Thus, these parts of the milking units are cleaned in the same manner as the milk pipe line 5 during operation of the cleaning system. During milking, the manifold 61 may be replaced by the usual vacuum regulating valve (not shown), or the nipples 61a may be closed by valves (not shown). Manifold arrangements for the present purpose are well known in the art, as shown, for example, in Recchia, Patent No. 2,794,420 dated June 4, 1957.

A further step in preparing the system for cleaning is to disconnect conduit 16, which may be a flexible hose, from the milk-collecting vessel (not shown) and insert its discharge end over the diversion valve pivot 69. The discharge end of conduit 16 will then cause water to be returned to either chamber 22 or discharge receptacle 23 depending on the position of diversion valve 68. As its upper part, the diversion valve 68 is connected to a solenoid S6 which, when energized, swings the valve on its pivot 69 to a position in which it discharges into storage chamber 22. In other words, the valve functions in such a manner that the circulating pump 13 is made to discharge into either the drain receptacle 23 or the storage chamber 22, depending upon whether the solenoid S6 is de-energized or energized.

In the operation of the system for rinsing, the solenoids S3 and S4 are energized to close drain valve 27 and open the tepid water valve 36, and the resulting filling of storage tank 22 causes float 47 to engage switch arm 46 with its upper contact U, thereby de-energizing solenoid 36 to cut off the supply of water and energizing solenoid S to start vacuum pump 9, which draws rinse water through conduit means 63—66 and milk pipe line 5 into receiver 7. Because the circulating pump 13 is not yet operating, the water level rises in receiver 7 until it reaches probe 52 and thus through control circuit 54 energizes solenoid S1 to start the circulating pump, which then draws water from receiver 7 and discharges it to drain receptacle 23 by way of diversion valve 68, whose solenoid S6 is de-energized. Thus, substantially all the water is drawn from tank chamber 22, the water passing continuously to receiver 7 and intermittently through pump 13 to the drain, due to continuous operation of vacuum pump 9 and the previously described intermittent operation of pump 13. The falling tank float 47 eventually causes switch arm 46 to reengage its lower contact L, thereby de-energizing solenoid S3 to open drain valve 27 and starting a timer (T1 in FIG. 2) which continuouly energizes the circulating pump solenoid S1 for a predetermined drying period, during which the pumps 9 and 13 effect a flow of air through the previously rinsed conduits and pipe line. At the end of the drying period, this timer de-energizes solenoids S and S1, stopping both pumps.

Figure 2:
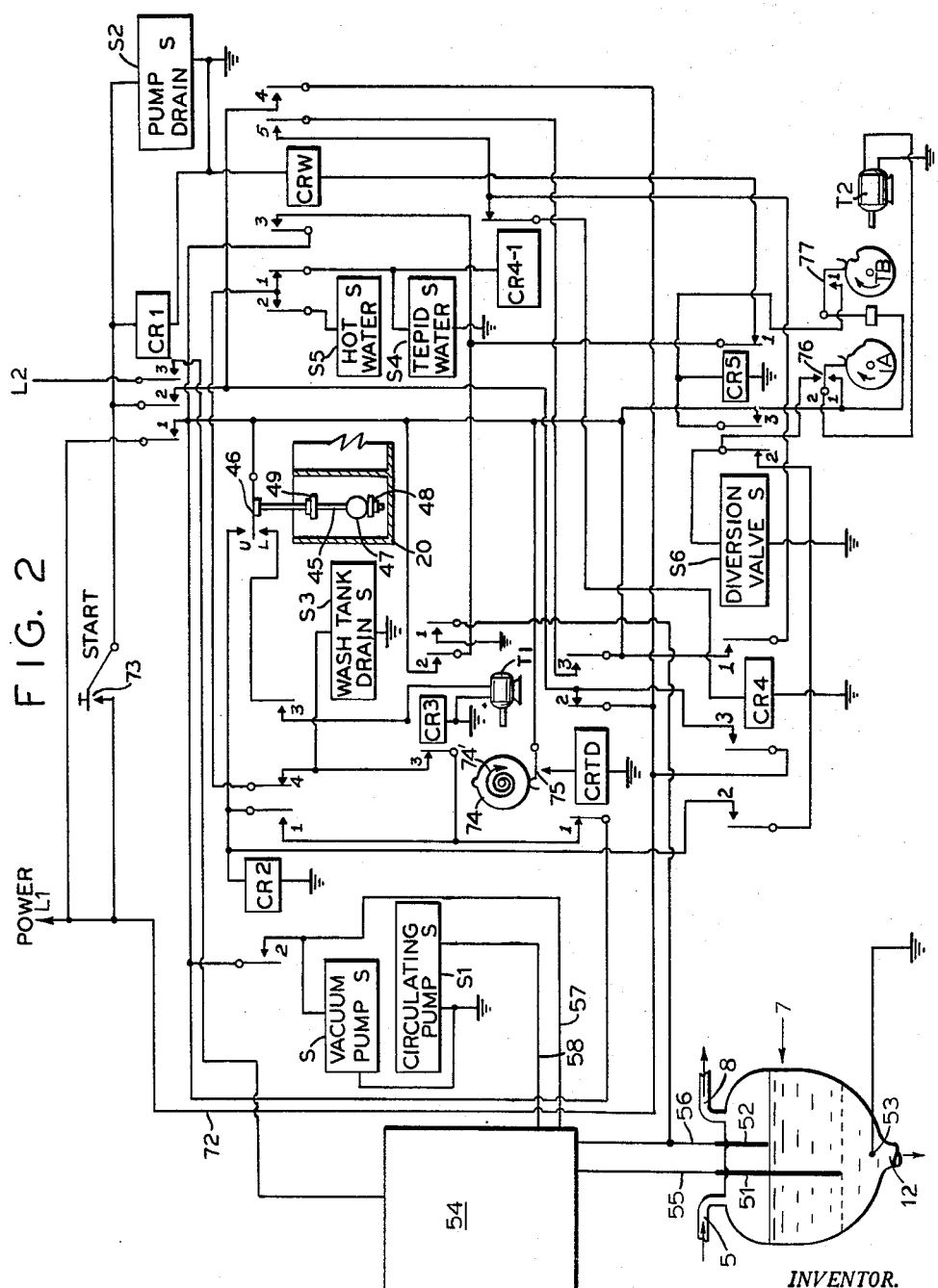
FIG. 2 is a wiring diagram of the controls for the system shown in FIG. 1.

In the operation of the system for washing, which is initiated by the drying timer on completion of the drying period, the operations are similar to those previously described except that the hot water solenoid S5 (instead of solenoid S4) is energized to fill the tank chamber 22 and is then de-energized by the upward shifting of switch arm 46, which in this case not only starts vacuum pump 9 but also energizes the diversion valve solenoid S6 under control of a second timer (T2 in FIG. 2). In this way, detergent solution is passed through the previously dried conduits and pipe line in the same manner as the rinse water but is recycled over a substantial period until the second timer de-energizes solenoid S6, whereby the diversion valve 68 discharges to drain receptacle 23, and the operations of unloading the tank chamber 22 and drying proceed as before.

After repeating the rinsing and drying operations, the system shuts down.

An example of circuitry for effecting these operations through a complete cycle is illustrated in FIG. 2, where the control elements shown in FIG. 1 appear. In FIG. 2, one side of an electric power line is indicated at 72, the other side being represented by ground. The circuitry includes (in addition to the electrical control elements previously described) a starting switch 73, relays CR1, CR2, CR3, CR4, CR4–1, CR5, CRW and CRTD. Timer motor T1 drives a cam 74 controlling a switch 75, and timer motor T2 drives cams TA and TB controlling switch arms 76 and 77, respectively. A contact is provided on the main control start relay CR1 to energize the receiver liquid level control 54 during the operation of the cleansing system.

The operations will now be described in detail in particular reference to FIG. 2.

A. *Initial Rinse Cycle*

(1) The system is started by momentarily closing the starting switch 73, whereby:

(*a*) Relay CR1 is energized and held energized via contact 2 of relay CR1 and contact 2 of relay CRTD to power line 72.

(*b*) The solenoid S3 for the tank drain valve 27 is energized via contact 3 of relay CR3, contact 1 of relay CRTD and contact 1 of relay CR1 to power, and closes the drain 25.

(*c*) The tepid (90° F.) water solenoid S4 is energized via contact 1 of relay CRW, contact 4 of relay CR2, contact 3 of relay CR3, contact 1 of relay CRTD and contact 1 of relay CR1 to power, and opens the tepid water line, thus permitting the tepid water to flow into the tank storage chamber 22.

(*d*) Relay CR4–1 is energized in parallel with the tepid water solenoid and opens contact 1 of relay CR4–1.

(2) When the tepid water reaches a high level in the storage chamber 22:

(*a*) The upper contact U of the float-actuated switch 46 closes and energizes relay CR2 via contact 1 of relay CR1 to power. Relay CR2 is held energized via contact 1 of relay CR2, contact 1 of relay CRTD and contact 1 of relay CR1 to power.

(*b*) The tepid water solenoid S4 is de-energized, since its energizing circuit (A1*c*) is broken at contact 4 of relay CR2, and the flow of tepid water into the tank ceases.

(*c*) Relay CR4–1, in a parallel circuit with the tepid water solenoid, is de-energized at the same time and closes contact 1 of relay CR4–1.

(*d*) The vacuum pump solenoid S is energized via contact 2 of relay CR2 and contact 1 of relay CR1 to power.

(3) The resulting operation of the vacuum pump 9 draws the tepid water from the tank through the milking system to the receiver jar 7. When the water reaches upper probe 52 in the jar 7, the circulating pump 13 is intermittently activated in the described manner and delivers the water via the diversion valve 68 to the drain receptacle 23.

(4) When the tank float 47 reengages lower stop 48 and lowers rod 45 in response to the emptying to storage chamber 22:

(*a*) The lower level contact L of the float-actuated switch 46 closes, thereby energizing relay CR3 via contact 3 of relay CR2 and contact 1 of relay CR1 to power.

(*b*) The timer motor T1 (in a parallel circuit with relay CR3) is started via contact 3 of relay CR2 and contact 1 of relay CR1 to power.

(*c*) The drain valve solenoid S3 has its energizing circuit (A1*b*) broken at contact 3 of relay CR3. Accordingly, the drain valve 27 opens and any residual water in the tank passes to the drain.

(*d*) The circulating pump 13 begins to run continuously as its solenoid S1 is energized via contact 1 of relay CR3 which connects the upper probe 52 to ground, and air is drawn through the milking system to air-dry the same.

(*e*) Relay CRW is energized via contact 1 of relay CR5, contact 2 of relay CR3 and contact 1 of relay CR1 to power, and is held energized via contact 1 of relay CR5, contact 3 of relay CRW and contact 1 of relay CR1 to power.

(5) At the conclusion of the drying cycle determined by timer T1:

(*a*) Relay CRTD is momentarily energized via switch 75 (closed by timer cam 74) and contact 1 of relay CR1 to power.

(*b*) Relay CR4 is energized via contact 1 of relay CR4–1, contact 5 of relay CRW, contact 3 of relay CRTD and contact 1 of relay CR1 to power, and held energized via contact 1 of relay CR4–1, contact 1 of relay CR4 and contact 1 of relay CR1 to power.

(*c*) The holding circuit (A2*a*) for relay CR2 is opened at contact 1 of relay CRTD, and relay CR2 is de-energized.

(*d*) The energizing circuit (A2*d*) for the vacuum pump and the intermittent operation of the circulating pump is opened at contact 2 of relay CR2, and the vacuum pump shuts down.

(*e*) The energizing circuit (A4*a*) for relay CR3 and for timer T1 in parallel therewith is opened at contact 3 of relay CR2. Accordingly, relay CR3 is de-energized and the timer T1 returns to set position under the influence of spring 74′.

(*f*) The energizing circuit (A4*d*) for the continuous operation of the circulating pump is opened at contact 1 of relay CR3 and the circulation pump shuts down.

(*g*) During the momentary break of the holding circuit (A1*a*) for relay CR1 at contact 2 of relay CRTD, relay CR1 is held energized via contact 2 of relay CR1 and contact 4 of relay CRW to power.

B. *Wash Cycle*

(1) With relay CRW held energized (see A4*e*), relay CR4 held energized (see A5*b*) and relay CR1 held energized (see A5*g*) at the conclusion of the momentary energization (see A5*a*) of relay CRTD:

(*a*) The solenoid S3 for the drain valve 27 is energized via contact 3 of relay CR3, contact 1 of relay CRTD and contact 1 of relay CR1 to power, and the drain valve closes.

(*b*) The solenoid S5 for the hot (180° F.) water line is energized via contact 2 of relay CRW, contact 4 of relay CR2, contact 3 of relay CR3, contact 1 of relay CRTD and contact 1 of relay CR1 to power, and opens that line to fill storage chamber 22 with hot detergent solution, as previously described.

(2) When the hot solution reaches the pre-set level in the tank chamber 22:

(*a*) The upper contact U of the float-actuated switch 46 closes and energizes relay CR2 via contact 1 of relay CR1 to power. Relay CR2 is held energized via contact 1 of relay CR2, contact 1 of relay CRTD and contact 1 of relay CR1 to power.

(*b*) The solenoid S5 for the hot water line is de-energized, since its energizing circuit (B1*b*) is broken at contact 4 of relay CR2, and the flow of hot solution into the tank ceases.

(*c*) The vacuum pump solenoid S is energized via contact 2 of relay CR2 and contact 1 of relay CR1 to power.

(*d*) The diversion valve solenoid S6 is energized via contact 2 of relay CR5, contact 2 of relay CR4, contact U of the float switch 46, and contact 1 of relay CR1 to power. Thus, the diversion valve will now deliver the flow from the circulating pump back to the tank storage chamber 22.

(*e*) The 20 minute timing motor T2 is energized via contact 2 of the disc TA, contact 2 of relay CR5, contact 2 of relay CR4, contact U of the float switch 46, and contact 1 of relay CR1 to power.

(3) The operation of the vacuum pump draws hot detergent solution from the storage chamber 22 through the milking system to the receiver jar 7. When the liquid reaches the upper pre-set level in receiver 7, the circulating pump is intermittently activated and delivers the detergent solution via the diversion valve 68 back to the storage chamber 22 for continuous recirculation throughout the 20 minute time period.

(4) Just prior to the conclusion of the non-adjustable 20 minute time period:

(a) Cam disc TA moves switch arm 76 to disengage its contact 2 and engage its contact 1, thereby continuing power to motor T2 via contact 1 of relay CR1, and almost immediately thereafter.

(b) Cam disc TB momentarily closes switch 77, and relay CR5 is energized via switch 77 and contact 1 of relay CR1 to power. Relay CR5 is held energized via contact 3 of relay CR5 and contact 1 of relay CR1 to power.

(c) Relay CRW is de-energized due to its holding circuit (see A4e) being broken at contact 1 of relay CR5, but relay CR4 remains energized via contact 1 of relay CR4–1, contact 1 of relay CR4 and contact 1 of relay CR1 to power.

(d) The diversion valve solenoid S6 is de-energized due to its holding circuit (see B2d) being broken at contact 2 of relay CR5. Thus, the diversion valve 68 resumes its normal position for directing the water flow from the circulating pump to the drain receptacle 23.

(e) The timer motor T2 continues to run until switch arm 76 disengages its contact 1 by action of disc TA, whereupon the motor T2 stops since its energizing circuit (see B2e) is now open at contact 2 of relay CR5.

(5) With the liquid flow from the circulating pump now going to drain:

(a) The tank float 47 will eventually bottom and operate switch arm 46 to make its lower contact L, thus energizing relay CR3 via contact 3 of relay CR2 and contact 1 of relay CR1 to power, and starting timer T1.

(b) The drain valve solenoid S3 is de-energized and opens valve 27 to drain residual water from the tank, since the solenoid energizing circuit (see B1a) is opened at CR3–3.

(c) The circulating pump solenoid S1 is energized continuously via contact 1 of relay CR3 which connects the upper probe 52 to ground. Accordingly, when the reservoir 22 is sufficiently emptied, air is passed through the conduit means 63—66 and the parts 5, 7, 12 and 16 to dry them.

(6) At the conclusion of the time interval determined by the timer T1:

(a) Relay CRTD is momentarily energized via timer switch 75 and contact 1 of relay CR1 to power.

(b) The holding circuit (see B2a) for relay CR2 is opened at contact 1 of relay CRTD, and relay CR2 is de-energized.

(c) The energizing circuit (see B2c) for the vacuum pump solenoid S and for intermittent operation of the circulating pump is opened at contact 2 of relay CR2, and the vacuum pump shuts down.

(d) The energizing circuit (see B5a) for relay CR3, and timer T1 in parallel therewith, is opened at contact 3 of relay CR2. Accordingly, relay CR3 is de-energized and the timer T1 returns to set position under the influence of spring 74'.

(e) The energizing circuit (see B5c) for continuous operation of the circulating pump is opened at contact 1 of relay CR3 and the circulating pump shuts down.

(f) During the momentary break of the holding circuit (see A1a) for relay CR1 at contact 2 of relay CRTD, relay CR1 is held energized via contact 2 of relay CR1 and contact 3 of relay CR4 to power.

C. 2nd or Final Rinse Cycle (1) With relay CR1 held energized (see B6f), relay CR5 held energized (see B4b) and relay CR4 held energized (see B4c) at the conclusion of the momentary energization (see B6a) of relay CRTD:

(a) The solenoid S3 for the drain valve is energized via contact 3 of relay CR3, contact 1 of relay CRTD and contact 1 of relay CR1 to power, and the drain valve 27 closes.

(b) The solenoid S4 for the tepid water line is energized via contact 1 of relay CRW, contact 4 of relay CR2, contact 3 of relay CR3, contact 1 of relay CRTD and contact 1 of relay CR1 to power, and opens that line to permit the tepid water to flow into the tank chamber 22.

(c) Relay CR4–1 is energized in parallel with the tepid water solenoid. Accordingly, relay CR4 is de-energized since its holding circuit (see B4c) is opened at contact 1 of relay CR4–1.

(2) When the tepid water reaches the high level in the tank chamber 22:

(a) The upper contact U of the float-actuated switch 46 closes and energizes relay CR2 via contact 1 of relay CR1 to power. Relay CR2 is held energized via contact 1 of relay CR2, contact 1 of relay CRTD and contact 1 of relay CR1 to power.

(b) The solenoid S4 for the tepid water line is de-energized (and the flow of water into the tank ceases) since its energizing circuit (see C1b) is broken at contact 4 of relay CR2. At the same time relay CR4–1, in parallel therewith, is de-energized.

(c) The vacuum pump solenoid S is energized via contact 2 of relay CR2 and contact 1 of relay CR1 to power.

(3) The operation of the vacuum pump draws the tepid water from the tank through the milking system to the receiver 7. When the water reaches the upper pre-set level in receiver 7, the circulating pump is intermittently activated in the usual manner and delivers the water via the diversion valve to drain.

(4) When the tank float 47 bottoms:

(a) The lower level contact L of the float-actuated switch 46 closes, thereby energizing relay CR3 via contact 3 of relay CR2 and contact 1 of relay CR1 to power.

(b) The timer T1 (in a parallel circuit with relay CR3) is started via contact 3 of relay CR2 and contact 1 of relay CR1 to power.

(c) The drain valve solenoid energizing circuit (see C1a) is broken at contact 3 of relay CR3. Accordingly, the drain valve 27 opens, and any residual water in the tank passes to its drain.

(d) The circulating pump is caused to run continuously via contact 1 of relay CR3 grounding upper probe 52, and air is drawn through the milk line to air-dry the same.

(5) At the conclusion of the time interval determined by the timer T1:

(a) Relay CRTD is momentarily energized via switch 75 of timer T1 and contact 1 of relay CR1 to power.

(b) The holding circuit (see C2a) for relay CR2 is opened at contact 1 of relay CRTD, and relay CR2 is de-energized.

(c) The energizing circuit (see C2c) for the vacuum pump and intermittent operation of the circulating pump is opened at contact 2 of relay CR2, and the vacuum pump shuts down.

(d) The energizing circuit (see C4a) for relay CR3, and for timer T1 in parallel therewith, is opened at contact 3 of relay CR2. Accordingly, relay CR3 is de-energized and the timer T1 returns to set position under the influence of spring 74'.

(e) The energizing circuit (see C4d) for continuous operation of the circulating pump is opened at contact 1 of relay CR3 and the circulating pump shuts down.

(f) The heretofore available holding circuits (see A5g and B6f) for relay CR1 via contact 2 of relay CR1, during the momentary break at timer switch 75, are now open at contact 4 of relay CRW and contact 3 of relay CR4, respectively. Accordingly, relay CR1 is de-energized.

(g) Relay CR5 is de-energized since its holding circuit (see B4b) is opened at contact 1 of relay CR1.

It should be noted that the circulating pump drain solenoid S2 is energized to hold the pump drain closed at all times when the system is in operation. The solenoid is energized in parallel with relay CR1 (see A1a, A5g and B6f) and de-energized in parallel with relay CR1 (see C5f).

The timer T1 is adjustable to vary the duration of each drying period, which may be from 1½ to 5 minutes, but timer T2 is permanently set to provide a recycling period of 20 minutes.

As will be apparent from the foregoing, means for opening one of the supply valves 36 and 44 to accumulate liquid in chamber 22 include the respective solenoid S4 or S5 and solenoid CR1; the switch 46-U forms a device responsive to a high liquid level in chamber 22; means for closing the supply valve by operation of this responsive device include relay CR2; means for operating the circulating pump 13 by operation of this responsive device include vacuum pump 9 and its solenoid S, and the intermittently-operated liquid level control circuit 54; means for starting timer T2 by operation of this responsive device include relays CR4; means operable by this timer to shift the diversion valve 68 from its recycling to its drain position include relay CR5; the float switch 46-L and relay CR2 comprise means for starting the timer T1 in response to lowering of the liquid level in chamber 22 to a low level; and means operable by timer T1 for stopping the circulating pump 13 include relay CRTD.

Referring now to FIG. 3, the system there shown is similar to that illustrated in FIGS. 1 and 2, except for the circulating pump 13 and its controls. In FIG. 3, the circulating pump (indicated generally at 13a) comprises an inverted pipe T having a horizontal pipe 80 and a vertical pipe 81 leading upward from the intermediate part of pipe 80, the T 80—81 forming a pump chamber. A check valve 82 forms the pump inlet from receiver 7, and a check valve 83 forms the pump outlet leading to the discharge conduit 16, these check valves preventing reverse flow through the pump inlet and outlet, respectively. At its upper end, the vertical pipe 81 is connected through a conduit 84 to an intermittently-operating valve 85 which, in turn, communicates with vacuum line 8 through a fitting 86 similar to the stall cocks 6 (FIG. 1). Valve 85 is operable to connect the T pipe 81 alternately to the vacuum pump 9 and to atmosphere, as by way of an air inlet 87 in the valve 85. Intermittent operation of valve 85 may be effected pneumatically by the vacuum in line 8, pneumatically operated valves of this type being well known in the milking machine art as "pulsating pneumatic relays."

The operation of circulating pump 13a, comprising the parts 80 through 87, is as follows: With the vacuum pump 9 operating, liquid is sucked into receiver 7 from milk pipe line 5 and storage tank 22 (FIG. 1), the check valve 82 being held closed by the vacuum in receiver 7. By means of the pulsating pneumatic valve 85, the interior of the pump chamber 80—81 is alternately subjected to vacuum from pipe 8 and to atmosphere from air inlet 87. When the pump chamber 80—81 is under vacuum, check valve 82 opens and check valve 83 closes, and liquid from receiver 7 flows through check valve 82 into the chamber 80—81. When the pneumatic valve 85 operates to disconnect pump chamber 80—81 from vacuum and connect it to air inlet 87, the constant vacuum in receiver 7 will cause check valve 82 to close, and the atmospheric pressure from inlet 87 will open check valve 83 and allow the liquid to flow by gravity from pump chamber 80—81 through pipe 12 and conduit 16 to the diversion valve 68 (FIG. 1).

It will be apparent that in the FIG. 3 embodiment, the level controls associated with receiver 7 (FIG. 1) are omitted. In this case, the means for operating the circulating pump 13a, by operation of the high-level responsive device 46-U, include vacuum pump 9 and its solenoid S; and the means operable by timer T1 for stopping the circulating pump 13a include relay CRTD (FIG. 2), which is operable to stop the vacuum pump 9 (as previously described) and thereby stop the circulating pump 13a.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

I claim:

1. In a control system for an automated pipe line cleansing system having a reservoir for cleansing liquid with which said pipeline communicates, a pump for drawing liquid from the reservoir through the pipe line, a dual position valve for recirculating liquid from the pipe line into the reservoir in one position and for discharging liquid from the pipe line to a drain in another position, the combination comprising means for initiating cleansing liquid inflow to the reservoir, means for initiating operation of the pump, first timing means for maintaining said dual position valve in one position for a predetermined interval of time to recirculate liquid through the pipe line and reservoir for a predetermined washing cycle, means operable at the conclusion of said washing cycle to cause said dual position valve to be shifted to another position whereby said cleansing liquid is exhausted to drain, means responsive to exhaustion of said cleansing liquid to cause introduction of rinsing liquid into the reservoir, and further timing means responsive to exhaustion of rinsing liquid to interrupt operation of said pump.

2. For use in controlling automatic washing of a vacuum milking installation including a milk pipe line, a liquid reservoir, a supply line for delivering liquid to the reservoir, a liquid supply valve in the supply line, conduit means for connecting the reservoir to one end of the milk pipe line, a circulating pump having an inlet, means for connecting said inlet to the other end of the milk pipe line, whereby said pump is capable of sucking liquid from the reservoir through the conduit means and pipe line, a diversion valve connected to the pump outlet and operable in a first position to direct liquid from the pump back to the reservoir and in a second position to direct liquid from the pump to waste, the combination of means for actuating a supply valve to accumulate liquid in the reservoir, means responsive to actuation of a high liquid level device in the reservoir to interrupt actuation of the supply valve, further means responsive to the liquid level device for initiating operation of the pump when the diversion valve is in said first position to recycle liquid from the reservoir through the conduit means and milk pipe line, a first timer adapted to operate the diversion valve after a predetermined time interval, means responsive to said liquid level device for starting said first timer to shift the diversion valve to said second position, a second timer responsive to operation of said liquid level device at a different level, and means operable by said second timer for stopping the pump.

3. Automatic control means for use in a vacuum milking installation including a milk pipe line, a liquid reservoir, a supply line for delivering liquid to the reservoir, a liquid supply valve in the supply line, a conduit, means for connecting one end of said conduit to said reservoir and the other end of said conduit to one end of the milk pipe line, a recirculating pump having an inlet, means for connecting said inlet to the other end of the milk pipe line, whereby said pump is capable of sucking liquid from the reservoir through the conduit and pipe line, a diversion valve connected to the pump outlet and operable in a first position to direct liquid from the pump back to the reservoir and in a second position to direct liquid from the pump to waste, the combination of means for energizing a supply valve solenoid to accumulate liquid in the reservoir, means responsive to actuation of a high liquid level control device in the reservoir to de-energize said supply valve solenoid whereby said liquid supply valve is closed, further means responsive to the liquid level control device for initiating operation of the pump when the diversion valve is in said first position whereby liquid from the reservoir is recycled through the conduit and milk pipe line, a first interval timer connected to means for operating the diversion valve, means responsive to said liquid level control device for starting said first timer when liquid in the reservoir attains a predetermined level to shift the diversion valve to said second position, a second timer connected to said liquid level control device and operable thereby upon attainment of a predetermined minimum level, and means operable by said second timer to stop the pump.

4. For use in automatically cleansing a vacuum milking installation having a milk pipe line, a liquid reservoir, a supply line for delivering liquid to the reservoir, a liquid supply valve in said supply line, a conduit, means for connecting one end of said conduit to the lower portion of said reservoir and for connecting the other end of said conduit to one end portion of the milk pipe line, a discharge pump having an inlet, means for connecting said inlet to the other end portion of the milk pipe line, whereby said discharge pump is capable of sucking liquid from the reservoir through said conduit and pipe line, a diversion valve connected to the pump outlet and operable in a first position to direct liquid from the pump back to the reservoir and in a second position to direct liquid from the pump to a waste drain, control means comprising in combination means for opening the supply valve to accumulate liquid in the reservoir, means responsive to a high liquid level in the reservoir to initiate operation of the pump, means for initiating closure of the inlet supply valve, means directing the diversion valve to its second position, means for maintaining operation of the pump with the diversion valve in said second position to draw liquid from the reservoir through the conduit and pipe line and discharge the liquid to waste, thereby lowering the level in the reservoir to a low level so that continued operation of the pump draws air through the conduit and pipe line to dry the same, a timer, and means responsive to a low liquid level in the reservoir for starting the timer, whereby the pump is stopped at the expiration of a preset timed interval.

5. Control means for a cleaning system according to claim 4, in which said pump operating means includes a receiver located in the milk pipe line intermediate said end portions, a vacuum pump connected to the receiver, means responsive to a high liquid level in the reservoir to start the vacuum pump and thereby draw liquid into the receiver from the reservoir, and means responsive to a high liquid level in said receiver for starting the discharge pump.

6. Control means for a cleaning system according to claim 4, in which said pump operating means includes a receiver located in the milk pipe line intermediate said end portions, a vacuum pump connected to the receiver, means responsive to a high liquid level in the reservoir to start the vacuum pump and thereby draw liquid into the receiver from the reservoir, means responsive to a high liquid level in said receiver for starting the discharge pump and thereby reducing the liquid level in the receiver, and means responsive to lowering of the liquid level in the receiver to a low level for stopping the discharge pump to increase the liquid level in the receiver, whereby the discharge pump is operated intermittently.

7. Control means for a cleaning system according to claim 4, in which said pump operating means includes a receiver located in the milk pipe line intermediate said end portions, a vacuum pump connected to the receiver, means responsive to a high liquid level in the reservoir to start the vacuum pump and thereby draw liquid into the receiver from the reservoir, means responsive to a high liquid level in said receiver for starting the discharge pump and thereby reducing the liquid level in the receiver, means responsive to lowering of the liquid level in the receiver to a low level for stopping the discharge pump to increase the liquid level in the receiver, whereby the discharge pump is operated intermittently, and means responsive to said lowering of the liquid level in the reservoir for operating the discharge pump continuously under control of the timer.

8. Control means for a cleaning system according to claim 4, in which said pump operating means includes a receiver located in the milk pipe line intermediate said end portions, a vacuum pump connected to the receiver, means responsive to a high liquid level in the reservoir to start the vacuum pump and thereby draw liquid into the receiver from the reservoir, means responsive to a high liquid level in said receiver for starting the discharge pump and thereby reducing the liquid level in the receiver, means responsive to lowering of the liquid level in the receiver to a low level for stopping the discharge pump to increase the liquid level in the receiver, whereby the discharge pump is operated intermittently, and means responsive to said lowering of the liquid level in the reservoir for operating the discharge pump continuously under control of the timer, the control system comprising also means operable by the timer for stopping the vacuum pump.

9. Control means for a cleaning system according to claim 4, in which the reservoir has a drain outlet, the control means comprising also a drain valve closing the drain outlet while said liquid supply valve is open, and means responsive to said lowering of the liquid level in the reservoir for opening the drain valve.

10. Control means for a cleaning system according to claim 4, including also a supply line for delivering a second liquid to the reservoir and having a second liquid supply valve, means operable by the timer for opening the second supply valve to accumulate a body of the second liquid in the reservoir, means responsive to a high level of liquid in the reservoir for closing the second supply valve, and shifting the diversion valve to said first position to recycle liquid from the reservoir through said conduit and pipe line, a second timer, means responsive to a high level of liquid in the reservoir for starting the second timer, and means operable by the second timer to return the diversion valve to said second position to lower the liquid level in the reservoir to a low level.

11. Control means for a cleaning system according to claim 4, including also a supply line for delivering a second liquid to the reservoir and having a second liquid supply valve, means operable by the timer for opening the second supply valve to accumulate a body of the second liquid in the reservoir, means responsive to a high level of liquid in the reservoir for closing the second supply valve, and shifting the diversion valve to said first position to recycle liquid from the reservoir through said conduit and pipe line, a second timer, means responsive to a high level of liquid in the reservoir for starting the second timer, means operable by the second timer to return the diversion valve to said second position to lower the liquid level in the reservoir to a low level, and means responsive to a second operation of the first timer for causing repetition of the operating cycle specified in claim 4.

12. For use in automatic cleansing of a vacuum milking installation including a milk pipe line, a liquid storage reservoir, supply valves operable selectively to supply a washing liquid or a rinsing liquid to the reservoir, a conduit, means for connecting said conduit between the lower portion of said reservoir and one end portion of said pipe line, a discharge pump having an inlet, means for connecting said inlet to the other end portion of said pipe line whereby said discharge pump is capable of sucking liquid from the reservoir through the conduit and pipe line, a diversion valve connected to the pump outlet and operable in a first position to direct liquid from the pump back to the storage reservoir and in a second position to direct liquid from the pump to a waste drain, an automatic control comprising in combination, means for actuating the supply valve to accumulate washing liquid in the reservoir, a device responsive to a high liquid level in the reservoir, first and second timers, means operable by said responsive device for operating the pump while holding the diversion valve in said first position under control of the first timer, means operable by the first timer to shift the diversion valve to said second position, means responsive to lowering of said liquid level to a low level for starting the second timer, and means operable by the second timer for stopping the pump 13. An automatic control system according to claim 12, comprising further means operable by the second timer for actuating the supply valves to accumulate rinsing liquid in the reservoir and means operable by said last actuation of the supply valves for maintaining the diversion valve in said second position during operation of the pump.

14. In a pipe line cleansing apparatus having a reservoir for cleansing liquid with which the pipe line is adapted to communicate, pump means operatively connected with the pipe line for drawing liquid from the reservoir through the pipe line, a dual position valve for recirculating liquid from the pipe line into the reservoir in one position and for discharging liquid from the pipe line to a drain in another position, the combination comprising means for initiating cleansing liquid inflow to the reservoir, means for initiating operation of the pump means, timing means for maintaining said dual position valve in one position for a predetermined interval of time to recirculate cleansing liquid through the pipe line and reservoir for a predetermined washing cycle, means operable at the conclusion of said washing cycle to cause said dual position valve to be shifted to another position whereby said cleansing liquid is exhausted to drain and whereby subsequently rinsing liquid is exhausted to drain, means responsive to exhaustion of said cleansing liquid to cause introduction of rinsing liquid into the reservoir, and means responsive to exhaustion of rinsing liquid to interrupt operation of said pump means.

15. In a pipe line cleansing apparatus having a reservoir for cleansing liquid with which the pipe line is adapted to communicate, a receiver intermediate the ends of the pipe line with the section of the pipe line remote from the reservoir being connected to the lower portion of the receiver, a vacuum pump connected to the receiver, a second pump connected to said remote section of the pipe line, means responsive to a predetermined high liquid level in the reservoir to start the vacuum pump and thereby draw liquid into the receiver from the reservoir, means responsive to a predetermined high liquid level in the receiver for starting the second pump, a dual position valve for recirculating liquid from the second pump into the reservoir in one position and for discharging the liquid to a drain in another position, means for initiating cleansing liquid inflow to the reservoir, timing means for maintaining said dual position valve in one position for a predetermined interval of time to recirculate cleansing liquid through the pipe line and reservoir for a predetermined washing cycle, means operable at the conclusion of said washing cycle to cause said dual position valve to be shifted to another position whereby said cleansing liquid is exhausted to drain and whereby subsequently rinsing liquid is exhausted to drain, means responsive to exhaustion of said cleansing liquid to cause introduction of rinsing liquid into the reservoir, and means responsive to exhaustion of rinsing liquid to interrupt operation of said first and said second pumps.

16. In a vacuum milking installation having a milk pipe line, a system for cleaning said pipe line comprising tank means forming a chamber, a supply line for delivering liquid to the tank chamber, a liquid supply valve in said supply line, conduit means leading from the lower portion of the tank chamber and adapted to be connected to one end portion of the milk pipe line, a circulating pump having its inlet adapted to be connected to the other end portion of the milk pipe line and adapted to be fed with liquid sucked from the tank through said conduit means and pipe line, a diversion valve connected to the pump outlet and operable in a first position to direct liquid from the pump back to the tank chamber and in a second position to direct liquid from the pump to waste, means for opening the supply valve to accumulate liquid in the tank chamber, a device responsive to a high liquid level in the chamber, means operable by said responsive device for closing the supply valve, means operable by said responsive device for operating the pump with the diversion valve in said first position and recycling liquid from the chamber through said conduit means and milk pipe line, a first timer, means operable by said high level responsive device for starting the first timer, means operable by the first timer to shift the diversion valve to said second position and lower the liquid level in the chamber, whereby continued operation of the pump draws air through said conduit means and pipe line for drying the same, a second timer, means responsive to lowering the liquid level in the chamber to a low level for starting the second timer, and means operable by the second timer for stopping the pump.

17. A cleaning system according to claim 16, in which said pump operating means includes a receiver located in the milk pipe line intermediate said end portions, a vacuum pump connected to the receiver, means operable by said high liquid level responsive device to start the vacuum pump and thereby draw liquid into the receiver from the tank chamber, and means responsive to a high liquid level in said receiver for starting the circulating pump.

18. A cleaning system according to claim 16, in which said pump operating means includes a receiver located in the milk pipe line intermediate said end portions, a vacuum pump connected to the receiver, means operable by said high liquid level responsive device to start the vacuum pump and thereby draw liquid into the receiver from the tank chamber, means responsive to a high liquid level in said receiver for starting the circulating pump and thereby reducing the liquid level in the receiver, and means responsive to lowering of the liquid level in the receiver to a low level for stopping the circulating pump to increase the liquid level in the receiver, whereby the circulating pump is operated intermittently.

19. A cleaning system according to claim 16, in which said pump operating means includes a receiver located in the milk pipe line intermediate said end portions, a vacuum pump connected to the receiver, means operable by said high liquid level responsive device to start the vacuum pump and thereby draw liquid into the receiver from the tank chamber, means responsive to a high liquid level in said receiver for starting the circulating pump and thereby reducing the liquid level in the receiver, means responsive to lowering of the liquid level in the receiver to a low level for stopping the circulating pump to increase the liquid level in the receiver, whereby the circulating pump is operated intermittently, and means responsive to said lowering of the liquid level in the chamber for operating the circulating pump continuously under control of the second timer.

20. A cleaning system according to claim 16, in which said pump operating means includes a receiver located in the milk pipe line intermediate said end portions, a vacuum pump connected to the receiver, means operable by said high liquid level responsive device to start the vacuum pump and thereby draw liquid into the receiver from the tank chamber, means responsive to a high liquid level in said receiver for starting the circulating pump and thereby reducing the liquid level in the receiver, means responsive to lowering of the liquid level in the receiver to a low level for stopping the circulating pump to increase the liquid level in the receiver, whereby the circulating pump is operated intermittently, and means responsive to said lowering of the liquid level in the chamber for operating the circulating pump continuously under control of the second timer, the system comprising also means operable by the second timer for stopping the vacuum pump.

21. A cleaning system according to claim 16, in which the tank chamber has a drain outlet, the system comprising also a drain valve closing the drain outlet while said liquid supply valve is open, and means responsive to said lowering of the liquid level in the chamber for opening the drain valve.

22. A cleaning system according to claim 16, comprising also an additive container, a supply pipe branching from said supply line for delivering liquid to the additive container under control of said supply valve, and a pipe line leading from the additive container for delivering liquid and additive to said tank chamber.

23. A cleaning system according to claim 16, comprising also an additive container, a supply pipe branching from said supply line for delivering liquid to the additive container under control of said supply valve, and a pipe line leading from the additive container for delivering liquid and additive to said tank chamber, said last pipe line having an inlet end located in said container above the bottom thereof.

24. A cleaning system according to claim 16, comprising also a receiver through which said other end portion of the milk pipe line is connected to said pump inlet, and a vacuum pump connected to the receiver for sucking liquid into the receiver from the tank, the circulating pump including a pump chamber, check valves forming the inlet and outlet, respectively, of the circulating pump and its chamber, and an intermittently operating valve for alternately connecting said pump chamber to the vacuum pump and to atmosphere, whereby the circulating pump operates intermittently to deliver liquid from the receiver to the diversion valve, said means operable by the second timer being operatively connected to the vacuum pump for stopping the vacuum pump and thereby the circulating pump.

References Cited in the file of this patent
UNITED STATES PATENTS

| | | |
|---|---|---|
| 2,893,407 | Babson | July 7, 1959 |
| 2,915,072 | Merritt | Dec. 1, 1959 |